Dec. 6, 1955 J. F. COLES 2,725,587
VACUUM CLEANER FOR MOTOR VEHICLES
Filed Dec. 2, 1952
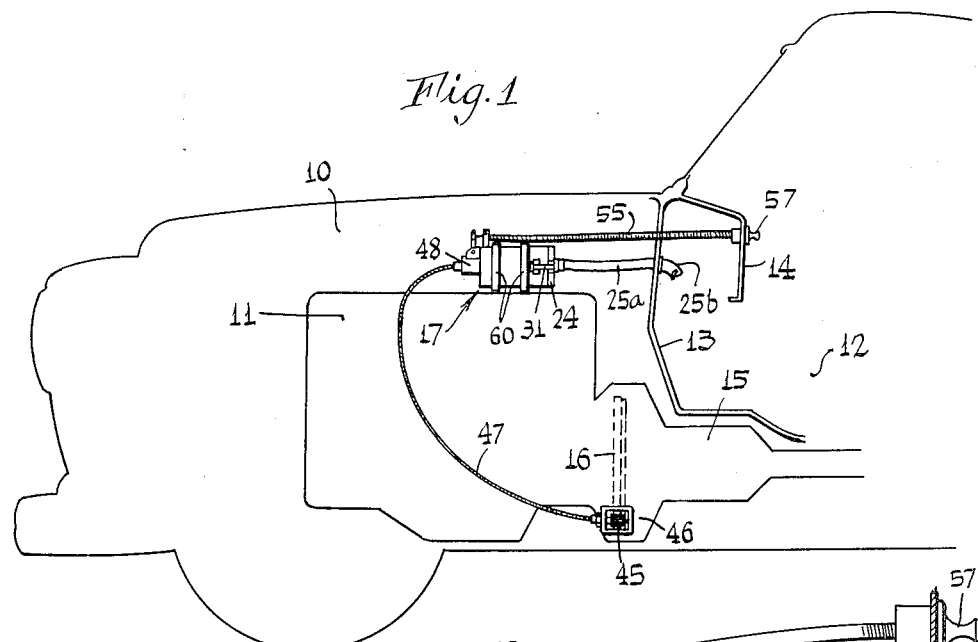
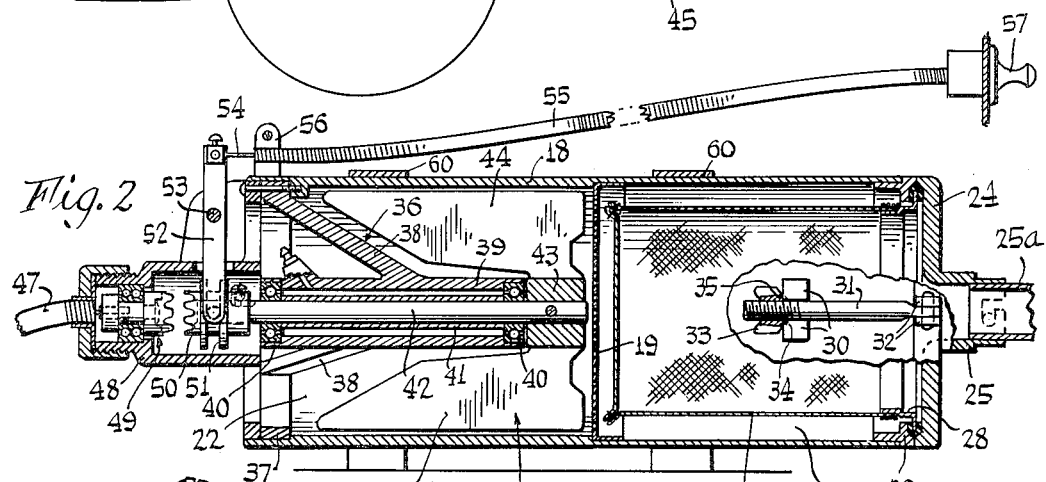
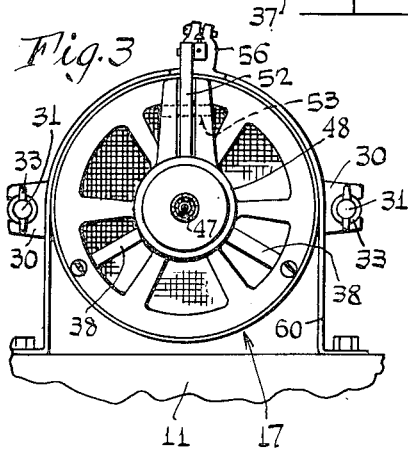
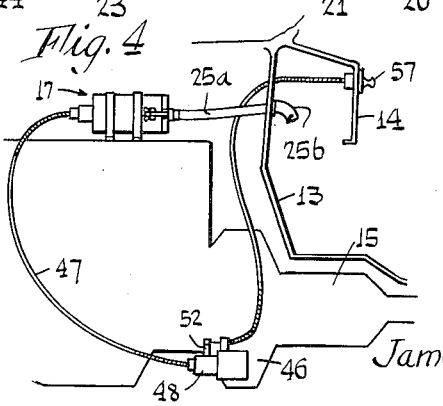
INVENTOR
*James F. Coles*
BY
*Johnson and Kline*
ATTORNEYS

United States Patent Office 2,725,587
Patented Dec. 6, 1955

2,725,587

VACUUM CLEANER FOR MOTOR VEHICLES

James F. Coles, Bridgeport, Conn.

Application December 2, 1952, Serial No. 323,657

3 Claims. (Cl. 15—313)

This invention relates to improved means for vacuum cleaning automobiles.

At the present time, to vacuum clean the interior of an automobile it is necessary for the individual to carry a household type vacuum cleaner and its attachments out of the house to a position adjacent the automobile, and in many cases provide an extension cord reaching through an electric socket or receptacle to the place where the automobile can be cleaned. The cleaning operation is most conveniently done in a garage but in many cases, especially in large cities, car owners do not have a private garage where such cleaning may be done and they must resort to the use of brushes or pay to have the vacuum cleaning done.

An object of this invention is to provide in an automobile a built-in vacuum cleaner including a filter tank and suction fan driven by the vehicle motor and conveniently arranged to receive a hose leading to nozzles or other attachments used for cleaning purposes.

Thus, when it is desired to clean the upholstery, floor and other parts in the tonneau of the vehicle, it is merely necessary to connect a hose and attachments used therewith to the filter tank, connect the fan to the vehicle motor as by throwing a clutch, and proceed to apply the attachments carried by the hose to the surfaces to be cleaned in the usual manner.

In the form of this invention illustrated herein as exemplary thereof, the filter tank and fan assembly are mounted in a convenient position under the hood of the engine compartment so that a hose on the inlet end of the tank may extend through the dashboard into the tonneau of the vehicle. A flexible shaft is provided with a driving connection to both the fan and a gear on the engine flywheel through a clutch to connect the fan to the flywheel when it is desired to use the device. Provision is made for operating the clutch from inside the tonneau. The tank body and its mounted end are separable so that access may be had to the interior of the tank for the convenient removal of the dust bag to empty the same.

Other features and advantages will hereinafter appear.

In the accompanying drawings which illustrate the form of this invention at present preferred—

Figure 1 is a schematic view of the front end of a motor vehicle showing the device of the present invention applied thereto.

Fig. 2 is a longitudinal section of the tank showing the dust bag mounting, the fan and the clutch for connecting the fan to the flexible driving shaft.

Fig. 3 is an end view of the tank shown in Fig. 2.

Fig. 4 is similar to Fig. 1 but shows a modified form of this invention.

As shown in Fig. 1, the motor vehicle has the usual compartment 10 for the engine 11 and this compartment is separated from the tonneau 12 by a dashboard 13 having an instrument panel 14. The flywheel or clutch 15 has a peripheral gear 16 usually engaged by the starter motor pinion.

The device of the present invention includes a tank 17 formed of a tubular body 18 having a dividing plate 19 forming a compartment 20 for a dust bag 21 and another compartment 22 for the fan 23.

In the form of the invention herein illustrated, one end of the tank body 18 is covered by a plate 24. This plate has a tubular neck 25 which receives a hose 25a adapted to extend through a hole in the dashboard 13. The hose 25a is flexible and has a fitting 25b at the rear of the dashboard, that is to say, inside the tonneau, to cooperate with the end of the cleaning hose which may be applied to it from the interior of the vehicle.

The dust bag 21 may be of any suitable form but preferably it is provided with a stiffened rim 28 which fits between a flange 29 on the tank body 18 and a cooperating surface on the closure plate 24 so that when the tank body and closure plate are fastened together the bag will be held securely in position. To secure the tank body 18 to the closure 24 in such a way that they can be separated to give access to the interior of the body for the removal of the dust bag, in the form of the invention shown the tank body is provided with forked lugs 30 receiving the ends of bolts 31 which are pivotally mounted at their other ends in lugs 32 carried by the closure plate. The ends of the rods 31 are threaded and receive wing nuts 33. When the body 18 is properly aligned with the closure plate 24, the rods 31 are swung into the slots of the lugs 30 and then the wing nuts 33 are tightened to securely draw the tank body against the closure. Each lug has a countersink 34 into which a conical end 35 of the wing nut extends to prevent the rod from swinging out once the wing nut is tightened.

At the forward end of the tank body 17 there is secured a bracket 36 comprising an annular portion 37 fitting within the tubular body 17 and three radial arms 38 extending into the compartment and secured to a sleeve 39. Within the sleeve 39 at each end thereof are ball bearings 40 spaced by a sleeve 41 and supporting for rotation a shaft 42. At its rear end the shaft 42 is secured to a hub 43 carrying fan blades 44 which occupy the space between the inclined arms 36 and the dividing plate 19.

As stated above, the device of the present invention is driven from the engine of the vehicle. For this purpose, a power takeoff comprising a gear 45 is inserted in the clutch housing 46 so as to engage the gear 16 on the vehicle clutch. A flexible shaft 47 is connected to the power takeoff and extends upwardly to the filter tank where it is connected to the driving shaft 42 of the fan. As shown, the end of the flexible shaft 47 is rotatably mounted in a housing 48 secured to the forward end of the tank and includes a clutch element 49 axially aligned with the shaft 42.

To connect the clutch element 49 with the shaft 42, the latter is provided with a clutch 50 having a spline connection with the shaft 42 and movable on the shaft to a position where its teeth engage the teeth of the clutch element 49. The clutch 50 has a grooved collar 51 which receives a clutch shifter 52 pivoted at 53 on the housing 48. The lower end of the clutch shifter is connected to a wire 54 within a sheath 55 which is secured to the tank by a clamp 56. The rear ends of the wire 54 and sheath 55 extend through a hole in the dashboard 13 and preferably terminate at the instrument panel 14 to which the sheath is attached in the usual manner, the wire 54 being attached to an operating knob 57.

When it is desired to use the vacuum cleaner of the present invention, the cleaner hose is attached to the fitting 25b, the engine is started, and the knob 57 is pulled out to connect the fan 23 to the flexible shaft. All of these operations can be done from inside the tonneau without the necessity of raising the engine hood. When the work has been completed, it is merely necessary to push the knob 57 back to uncouple the fan from the flexible shaft and remove the cleaner hose.

As shown in Figs. 1, 2 and 3 the clutch is located between the flexible shaft 47 and the fan. However, if desired, the clutch may be inserted between the flexible shaft and the power takeoff gear 45, as shown in Fig. 4.

The filter tank may be mounted on any convenient part under the engine hood. As shown it is secured to the engine block by straps 60.

Variations and modifications may be made within the scope of the claims and portions of the improvements may be used without others.

I claim:

1. A device for cleaning the tonneau of a motor vehicle having a dashboard separating the engine compartment and tonneau, said device comprising a self-contained cleaner unit including a tubular tank having a hose coupling-receiving neck at one end, a suction fan at the other end and a removable dust collecting bag disposed between the fan and neck to receive and retain dust drawn therein by the fan; means for mounting the tank in the engine compartment of the vehicle; a hose coupling connected to the tank and extending through the dashboard and accessible from within the tonneau to receive a cleaner hose; and driving means including a flexible shaft and a gear connected thereto and driven by a gear on the flywheel of the vehicle motor and a manually operable clutch connecting the suction fan to the flexible shaft.

2. A device for cleaning the tonneau of a motor vehicle having a dashboard separating the engine compartment and tonneau comprising a self-contained cleaner unit including a tubular tank having one end closed and provided with a hose coupling-receiving neck, a suction fan adjacent the other end of the tank, and a removable dust collecting bag disposed between the fan and neck to receive and retain dust drawn therein by the fan; means mounting the tank in the engine compartment of the vehicle; a hose coupling connected to the neck and extending through the dashboard and accessible from within the tonneau to receive a cleaner hose; driving means for rotating said fan including a flexible shaft and a power takeoff driven by the flywheel of the vehicle motor and connected to the suction fan to operate the same, said driving means including a clutch to control the rotation of the fan; and means for operating said clutch extending through the dashboard and accessible from within the tonneau of the vehicle.

3. A device for cleaning the tonneau of a motor vehicle having a dashboard separating the engine compartment and tonneau, said device comprising a self-contained cleaner unit including a tubular tank having a hose coupling-receiving neck at one end, a suction fan at the other end and a removable dust collecting bag disposed between the fan and neck to receive and retain dust drawn therein by the fan; means for mounting the tank in the engine compartment of the vehicle; a hose coupling connected to said neck and extending through the dashboard and accessible from within the tonneau to receive a cleaner hose; driving means for rotating said suction fan including a flexible shaft having a power takeoff gear driven by a gear on the flywheel of the vehicle motor, and a manually operable clutch completing the driving connection between the suction fan and said power takeoff gear; and means for operating said clutch extending through the dashboard and accessible from within the tonneau of the vehicle.

References Cited in the file of this patent

UNITED STATES PATENTS

| 1,199,509 | Tesnow | Sept. 26, 1916 |
| 1,220,297 | Vanderhoof | Mar. 27, 1917 |
| 1,409,183 | Keagle et al. | Mar. 14, 1922 |
| 1,464,080 | Langdon | Aug. 7, 1923 |
| 1,729,364 | Schwier et al. | Sept. 24, 1929 |
| 2,022,250 | Lofgren | Nov. 26, 1935 |
| 2,277,568 | Tavernese | Mar. 24, 1942 |
| 2,299,668 | Webster | Oct. 20, 1942 |
| 2,634,618 | Bagley | Apr. 14, 1953 |

FOREIGN PATENTS

| 528,227 | Germany | June 26, 1931 |